Aug. 3, 1954             R. R. HULL             2,685,175
BEVERAGE COOLER AND DISPENSER
Filed May 2, 1952                            2 Sheets-Sheet 2
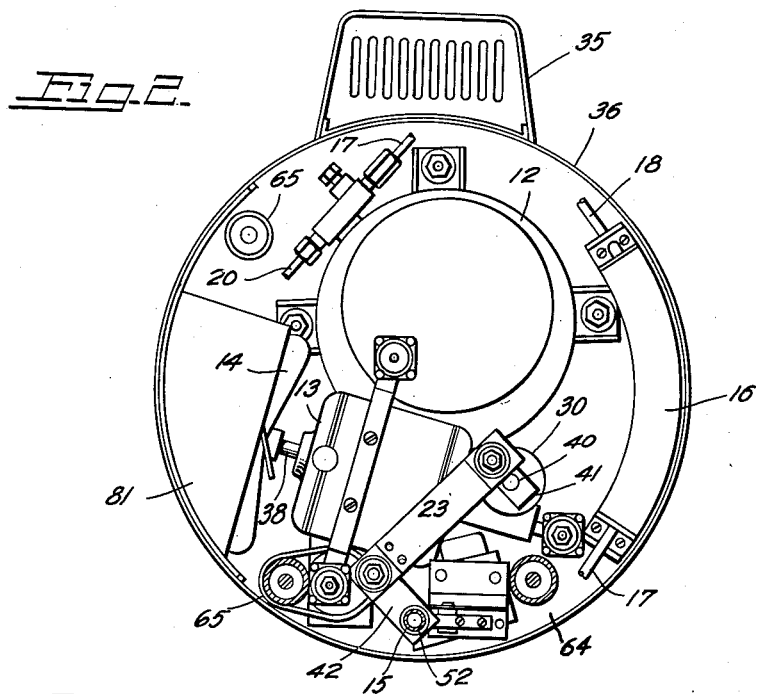
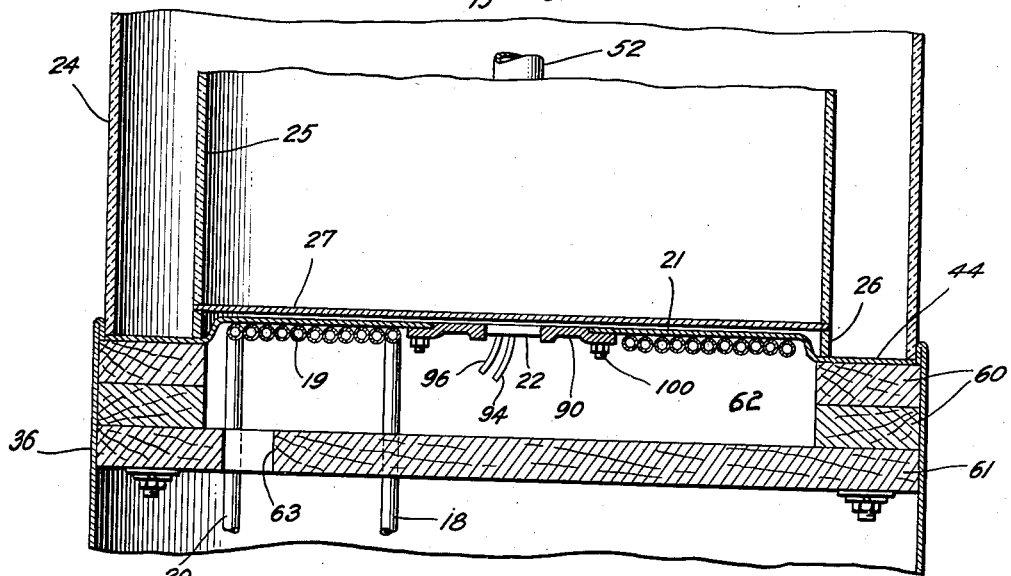
Inventor
Robert R. Hull
By Michael J. McDonald
Agent Patented Aug. 3, 1954

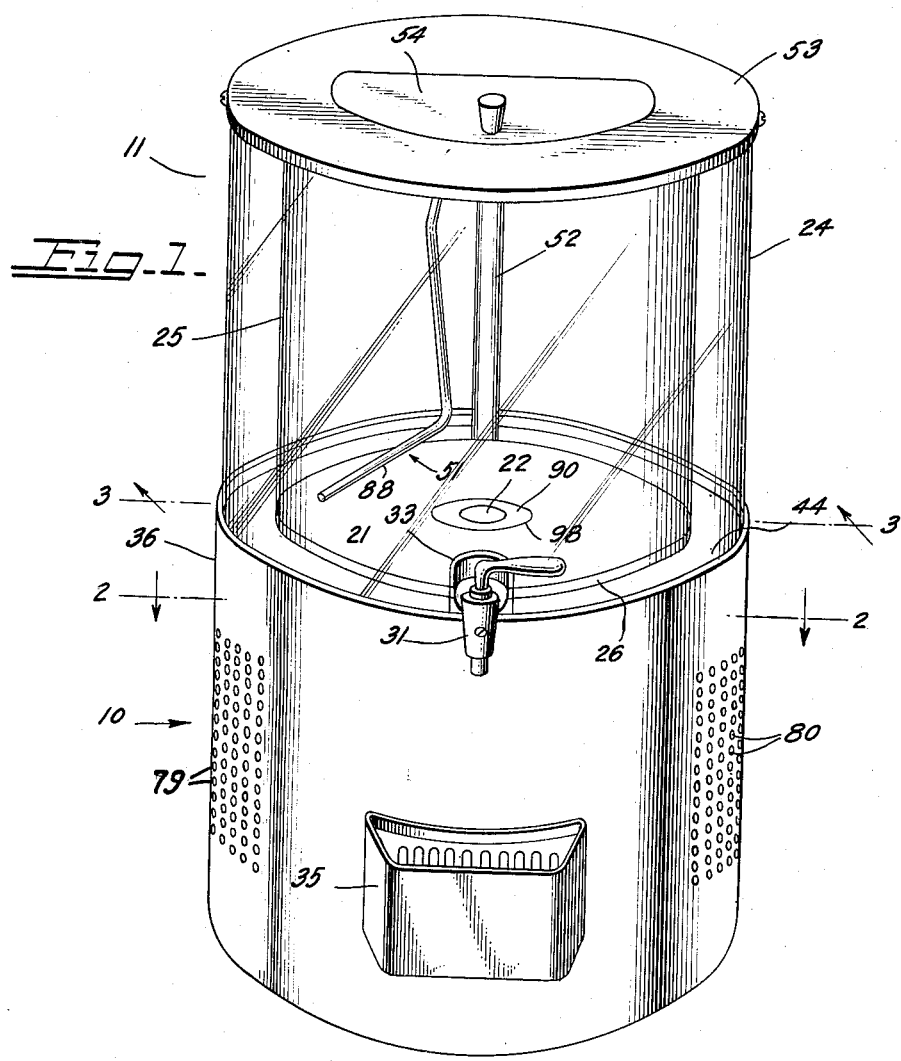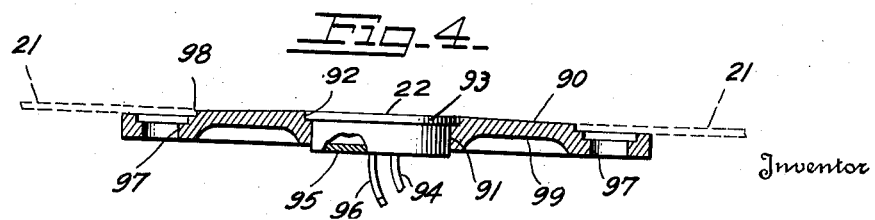

2,685,175

UNITED STATES PATENT OFFICE 2,685,175

BEVERAGE COOLER AND DISPENSER

Robert R. Hull, Pasadena, Calif., assignor to Sunkist Growers, Inc., Los Angeles, Calif., a corporation of California Original application September 6, 1949, Serial No. 114,248, now Patent No. 2,629,229, dated February 24, 1953. Divided and this application May 2, 1952, Serial No. 285,596

2 Claims. (Cl. 62—7)

My present invention relates to a sanitary beverage cooler and dispenser of the mechanically refrigerated type, capable of rapidly reducing the temperature of a beverage contained therein to a desired level and of maintaining it at that temperature level.

My invention possesses those outstanding, yet always difficultly attainable, attributes of utmost simplicity of construction and ease and efficiency of operation. It comprises a storage and dispensing container completely and instantly removable for cleaning or exchange without disengaging any fastenings and which has no auxiliary openings, connections, or gadgets to permit provision of an efficient thermostatic control.

My machine embodies a beverage container having a relatively flexible bottom supported in contact with a cold plate for the purpose of refrigerating the beverage, refrigerating mechanism for the cold plate including a novel fan arrangement, an outer shell spaced from and surrounding the beverage container to provide an insulating air space, and an agitator for the beverage contributing to the efficient and accurate control of the temperature thereof. A temperature control bulb is mounted on the cold plate in contact with the beverage container and insulated from the cold plate in order to effectively control the beverage temperature within relatively close limits. All of the foregoing mechanism is neatly and compactly arranged and completely housed so that the mechanism may not be tampered with unless the machine is partly disassembled.

A particular object of my invention as claimed herein is the provision of means whereby the juice container may be removably seated upon the cold plate in such manner as to avoid lateral displacement, and the introduction of moisture or condensate between those two members.

A further object is to provide a cold plate so refrigerated as to minimize heat absorption at its peripheral areas, which do not contact the juice container, and thereby to minimize water condensation and frosting thereupon.

Other objects will appear from the description which follows.

This application is a continuation in part of my copending application for Refrigerated Beverage Dispenser, Serial No. 94,171, filed May 19, 1949, and a division of my application Serial No. 114,248, filed September 6, 1949, which have now matured into the following patents: 2,629,236 and 2,629,229, respectively.

In the drawings:

Figure 1 is a perspective view of my dispenser and cooler showing the general arrangement of the parts.

Figure 2 is a cross sectional view taken along line 2—2 of Figure 1.

Figure 3 is a cross section taken roughly along line 3—3 of Figure 1, showing structural details of the cold plate, bulkhead and beverage container.

Figure 4 is a partial sectional view showing the details of my temperature control bulb and its associated elements.

It is known that many beverages are more palatable when served cold and that some beverages retain their palatability as well as other desirable and important characteristics for a longer period of time when maintained at a relatively low temperature. This is particularly true of citrus juices such as fresh orange juice, for example.

In order to cool a beverage and keep it cool in my cooler and dispenser, it is important to facilitate heat transfer from the beverage to the cold plate of the refrigerating unit on which the beverage container is supported. To aid in accomplishing this satisfactorily, and to contribute to the efficient and sensitive operation of the temperature control unit, it is desirable to keep the beverage constantly in motion. This is accomplished in my device by means of a continuously operated, oscillating agitator. Unless adequate agitation is provided, ice is likely to be formed on the inside of the container. The formation of such ice may prevent the temperature control from functioning properly in response to variations in beverage temperature. The agitator also serves to maintain insoluble solids uniformly distributed throughout the beverage. Such solids are present in fresh orange juice, for example, which contains a pulpy material mostly in the form of ruptured juice cells or sacs.

My cooler and dispenser comprises a base 10 having a superstructure 11 supported thereon. As shown in Figure 2, the base houses a compressor unit 12 containing a built-in motor and a compressor driven thereby, a motor 13 for driving fan 14 and agitator shaft 15, a refrigerant condenser 16, and other control elements and mechanisms associated with the motors and the refrigerating system. A cold plate 21, which may be made of stainless steel or other suitable material, forms a top for the base. In the interests of thermal efficiency the cold plate should be made as thin as practical so long as it is not made so thin that a relatively flat plate having a substantially regular upper surface could not be fabricated therefrom. I have found that in my dispenser, employing a container with a relatively flexible bottom, this plate may be satisfactorily fabricated from stainless steel sheet of approximately 16 gauge. The use of thin stock material in sheet form simplifies fabrication and accordingly reduces the cold plate material and manufacturing costs. A thin plate also increases the efficiency of the refrigerating system inasmuch as heat may more readily flow from the beverage through the cold plate to the cooling coil. Another important advantage of a thin cold plate is that it reduces the thermal inertia lag of the assembly. In other words the smaller the mass of the plate, the quicker it will follow temperature changes. A plate having a large mass would continue to cool the beverage even after the refrigerating mechanism cut off. When the beverage is being held near its freezing temperature this continued cooling after cut off could result in the undesirable formation of ice on the container bottom. When the refrigerating mechanism cuts on it must remove heat from the cold plate before it can function to cool the beverage and the quantity of heat to be so removed depends on the mass and specific heat of the cold plate. Thus the mass and thickness of the cold plate are important factors in closely controlling the beverage temperature.

The superstructure, as shown in Figures 1 and 3, includes a beverage container 25 and an outer shell 24 having a cover 53 which may be provided with a suitable hinged door 54. I prefer to make the container and outer shell of transparent material, such as a transparent plastic, but other suitable transparent, translucent, or opaque material may be used if desired.

The perimeter of the cold plate 21 is provided with a depressed portion or trough 44 which receives the lower portion of outer shell 24 and also the lower portion or extension 26 of beverage container 25. The trough cooperates with the shell and the container to facilitate their accurate placement in a centered, concentric position and prevents lateral displacement from this position. The trough also serves to retain any moisture that may be present due to condensation, for example, and in addition serves to increase the rigidity of the relatively thin cold plate. A suitable spigot 31 is provided for the beverage container and extends through a cutaway portion 33 in the outer shell. This cutaway portion permits removal of the outer shell by merely lifting the same out of the trough 44.

The bottom 27 of the container 25 is preferably made much thinner than the container side walls. In my preferred embodiment I have employed side walls about ¼" thick with good results. I prefer to make the bottom as thin as possible but not so thin that it would crack or shatter or become stretched or distorted under normal conditions of use, which include washing and sterilizing. While the container side walls and bottom may be made of any suitable material, I have found that when heat resistant "Lucite" (polymerized methyl methacrylate resin) is employed, a bottom thickness of approximately 0.10" is suitable. This relatively thin bottom of this material is sufficiently flexible to conform to any slight irregularities or distortions of the surface of the cold plate 21 so that a relatively complete contact is had between these elements to reduce the air gap and facilitate the flow of heat from the beverage in the container to the cold plate. The ability of my container bottom to conform to irregularities or distortion in the cold plate surface permits fabrication of the cold plate from relatively thin material even though such material will not ordinarily produce a perfectly flat plate. The production of a plate having a perfectly flat surface is particularly difficult when, as in my dispenser, the plate is formed with a peripheral trough, and a center opening and has a refrigerating coil secured to one side thereof by soldering. The plate is also subjected to variations in temperature in use and consequently subject to expansion and contraction that may cause temporary distortions in the plate. The thin container bottom will, in addition, offer less resistance to the flow of heat than would a thicker bottom. A bottom of the thickness and material indicated above has also been found to withstand normal sterilization and washing satisfactorily without heat softening the "Lucite" to such an extent that it is damaged or permanently distorted. In my preferred embodiment the bottom diameter is equal to the over-all diameter of the container and the bottom is cemented to the side walls of the container as shown in Figure 3. A side wall extension 26 is secured to the container bottom. This may take the form of a rim cemented or otherwise secured to the container bottom at its periphery. One of the functions of this rim is to cooperate with a wall of the cold plate trough 44 to locate and maintain the container in its proper lateral position with respect to the cold plate. Another important function of this ring is to reduce the possibility of condensate or accidentally spilled beverage entering the space between the container bottom and the cold plate. Still another function is to maintain the container bottom 27 out of contact with any flat supporting surface upon which the container may be placed when removed from the machine. This helps to prevent the container bottom, which is thin and somewhat flexible, from becoming scratched, punctured, or cracked and from picking up dirt or other foreign material when removed temporarily from the machine. Such dirt or other matter would, unless removed, prevent a good heat conducting contact between the container bottom and the cold plate and would greatly impair the efficiency of the cooling mechanism due to the poor heat conductivity of the resulting air gap.

The base of the machine is provided with a suitable casing 36 of any suitable material such as stainless steel. A drip trough 35 is detachably secured to the casing 36 below the spigot 31. This provides a support for a cup or other receptacle and catches any drip or spill over of the beverage.

The refrigerant, which may be Freon No. 12 (dichlorodifluoromethane) or other suitable material, normally flows as a gas from the high pressure side of the compressor unit 12, Figure 2, through tubing 17 to the condenser 18 from which it flows as a liquid through tubing 19 preferably to the center of refrigerating coil 19, Figure 3, which in turn discharges through tubing 20 to the low pressure side of the compressor unit. I prefer to deliver the liquid refrigerant to the center of the coil 19 so that it will flow outwardly to the periphery thereof. This arrangement makes it possible to so design the refrigerating mechanism and to adjust the refrigerant charge as to maintain the peripheral area of the cold plate, which is not covered by the beverage container, relatively warm and thus minimize or prevent the formation of frost or condensate on this area. Frosting of the peripheral area of the cold plate covered by the container bottom is also prevented or reduced, thus preventing or reducing the sticking of the container to the cold plate due to frost.

Refrigerating coil 19 is soldered or otherwise secured to cold plate 21 in any suitable manner that will facilitate the exchange of heat between these elements. This coil preferably covers a substantial area of the cold plate, leaving a free portion in which a thermostat control bulb 22 and its heat insulating ring 90 are positioned. As shown, the refrigerating element or coil 19 is annular in arrangement for convenience of manufacture, and the free portion is at the center. While I have shown and prefer to use a coil as the refrigerating element, this element, may be formed in other shapes or forms if desired. My cold plate is shown as circular in the drawings but it, as well as the base, the container and the outer shell, may be rectangular or of any other shape desired. It is preferable in all cases, however, to supply the refrigerant to the element in such a manner that the flow will be outwardly toward the periphery of the cold plate for the reasons set forth above.

I now wish to call attention in detail to a further important aspect of my invention.

In use, dispensers of the type disclosed may sometimes be filled with beverage at a temperature higher than the temperature at which the beverage is to be maintained in the dispenser. The temperature of this beverage may in some instances equal or exceed normal room temperature, whereas it may be desirable to dispense the beverage at a lower temperature. In the case of orange juice, for example, a highly desirable temperature at which to maintain the juice in the dispenser is from about 32° F. to about 34° F. It is, therefore, desirable to use the full capacity of the refrigerating mechanism by running it continuously from the time the beverage at relatively high temperature is placed therein until it is reduced to the temperature at which it is to be maintained within relatively close limits.

If the control bulb of a conventional bellows type temperature control unit is placed in the beverage container, operation of the refrigerating mechanism controlled by that unit will be dependent upon the temperature of the beverage. If the beverage is constantly agitated, operation will be satisfactory and there will be no ice formation provided the control is properly adjusted. Such an arrangement, however, introduces sanitary and mechanical difficulties that have, insofar as applicant is aware, ruled out the use of such a control arrangement in applications where sanitary conditions must be maintained. Maintenance of sanitary conditions is, of course, a prime requisite in a device of this general class. In a dispenser of the type herein disclosed the container must therefore be removed frequently for cleaning and sterilizing. This would involve lifting the control bulb out of the container, during which operation the capillary tube connecting it to the bellows would be flexed and subject to breakage. The control bulb and capillary tube could not readily be cleaned or sterilized. For this reason a dispenser employing the foregoing control arrangement would not meet the health requirements of many localities. There is also a possibility of leakage of the gas from the bulb or capillary tube into the beverage and this possibility is even more likely where an agitator is employed, inasmuch as it might rupture the bulb or capillary tube if it should come in contact therewith. It will be seen, therefore, that it is desirable to locate the control bulb at some point other than within the beverage container.

The bulb could be located directly in contact with the cold plate or with its refrigerating coil. When so located it would have to be adjusted to stop and refrigerating mechanism before the cold plate reached a temperature low enough to result in the formation of ice in the beverage. In other words, whenever the temperature of the coldest portion of the beverage approached its freezing point the refrigerating mechanism would have to be shut off. If the control were set for cut off at a lower temperature, ice would always be expected to form eventually. This ice would form a heat insulating layer on the container bottom between the beverage and the cold plate so that operation of the refrigerating mechanism would be only remotely responsive to the temperature of the liquid portion of the beverage. The lowest temperature for which this control could be set, without resulting in ice formation, would be slightly below the freezing point of the beverage and it would have to be set to cut off the operation of the refrigerating mechanism at this temperature. With such a control, the refrigerating mechanism would start to run when beverage at room temperature, or at any temperature substantially higher than that for which the control was set, was placed in the container, but it would not continue to run until the whole body of the beverage was reduced to the control point, say, approximately 32° F. It would run only until the refrigerating coil or cold plate, not the beverage, was reduced to that temperature. It is manifest, therefore, that the operation of the refrigerating mechanism would be initially cut off before the beverage was reduced to the desired temperature. The beverage, after the first cut off of the refrigerating mechanism, would still be relatively warm and would, therefore, rather quickly rewarm the control bulb, thus causing the refrigerating mechanism to start to run again. The above cycle would then be repeated. Moreover, it would continue to be repeated, and at increasing frequency as the beverage temperature decreased, since less time would be required in each instance to cool the control bulb back down to the temperature control point. It would take a relatively long time, therefore, to reduce the beverage itself to the desired temperature. In other words, with the control bulb so located, the refrigerating mechanism would not, and could not, be utilized to remove heat from the beverage at a rate corresponding to the maximum capacity of the refrigerating mechanism. It is even possible, when the control bulb is located directly in contact with the cold plate or with the refrigerating coil, for the beverage actually to get warmer rather than cooler, even though the refrigerating mechanism is cycling on and off, if the beverage is initially at a temperature below that of the surrounding atmosphere. Under such conditions, the warming of the beverage due to the ambient temperature is at a rate greater than the rate of heat removal from the beverage by the refrigerating mechanism operating on short cycles. For the foregoing reasons, location of the control bulb directly in contact with the cold plate or the refrigerating coil does not result in operation of the refrigerating mechanism in direct response to the beverage temperature, but rather in response to the temperature of the refrigerating coil or cold plate. With such a control arrangement, the full capacity of the refrigerating mechanism cannot be utilized to quickly reduce the beverage temperature to the desired dispensing temperature.

Obviously, however, great advantages are to be achieved in ease and low cost of manufacture, in convenience in installing and removing the beverage container, and in cleansing and caring for both the beverage container itself and for the rest of the machine, if, while at the same time achieving both effective temperature control within the beverage and maximum effective utilization of the capacity of the refrigerating mechanism, it is possible simply to set the container upon the cold plate to install it and to pick it up again to remove it, with no connection or fastening to be inserted or removed or to be adjusted.

I have succeeded both in overcoming the difficulties explained above and in achieving the above stated highly desirable results, all of which I accomplish by mounting my temperature control bulb 22 integrally with the cold plate 21 and within the area of the surface thereof and at the same time surrounding the control element 22 with heat insulating ring 90. This assemblage is shown in detail in Figure 4. This insulating ring is preferably made of material that is impervious to moisture, a poor heat conductor, and easily machinable or capable of being otherwise readily fabricated. I have found in practice that paper base phenolic laminated fibre such as "Black Paper XX Phenolic," available from C. D. La Moree of Los Angeles, California, is a suitable material and this is the one I prefer to use. The insulating ring is preferably annular as shown in Figure 1 and is provided with a central opening 91, counterbored at 92 to receive the control bulb 22. The control bulb may be made of stainless steel or other suitable material and is provided with a rim 93 which is received in the counterbore 92. Capillary tube 94 is soldered or otherwise secured to a plate 95, which in turn is soldered or otherwise secured to the control bulb to form a bottom therefor. The capillary tube communicates with the interior of the control bulb. Tube 96 is also secured to the plate 95 and provides access to the control bulb system for charging with any suitable gas, such as methyl chloride, for example. After charging, tube 96 is pinched off and is soldered or otherwise sealed to close the system. Suitable openings 97 are provided for the purpose of receiving bolts 100 which are welded or otherwise secured to the bottom of the cold plate and which serve to secure ring 90 and its associated control bulb 22 in an opening 98 in the cold plate. A suitable cement is also applied to the cold plate, bulb, and ring joints to prevent the entry of moisture. In order to further insulate the control bulb from the cold plate and to restrict the flow of heat therefrom to the cold plate, I reduce the cross sectional area of the ring 90 by forming an annular groove 99 therein, concentric with and surrounding the opening 91.

Capillary tube 94 communicates with the bellows of a conventional control element not shown herein. Any high quality control having a narrow range of response may be used. The control includes a switch operated by the bellows in response to variations in pressure in the system resulting from variations in temperature of the control bulb 22 and the gas contained therein. I connect this switch in my compressor motor circuit so that operation of the compressor is governed by the control.

It will, upon due consideration, be apparent that by the above construction and arrangement of elements, I have provided a system in which, during normal operation, the flow of heat will always be from the beverage to the cold plate, inasmuch as the cold plate temperature will be less than the beverage temperature. Assuming uniform resistance to heat flow over the bottom area of the container, the greatest flow of heat will take place at the points or areas of greatest temperature differential. This area of greatest temperature differential will be the annular area directly over the refrigerating coil. Heat flowing from the beverage to the control bulb will, of course, tend to increase the temperature of the bulb to a temperature approximating, but still somewhat below, the beverage temperature. In view of the fact that the control bulb is insulated, as by means of ring 90, from the cold plate, there will be a minimum of heat flow through this ring from the control bulb to the cold plate; and the temperature of the control bulb will consequently vary substantially as the temperature of the beverage rather than as the temperature of the cold plate.

With this arrangement and in a commercial machine constructed in accordance with the instant disclosure, it has been shown to be possible for the cold plate to reach temperatures in the neighborhood of −20° F., or below but inasmuch as the control bulb is responsive to beverage temperature, the refrigerating mechanism will continue to operate until the beverage reaches the desired point, at which time the control bulb will have become cold enough to function to operate the control mechanism to shut off the refrigerating mechanism. It will be seen, therefore, that when relatively warm beverage is placed in the container a large temperature differential may be established and maintained between it and the cold plate, thus effecting a rapid flow of heat from the beverage to the cold plate and consequently a rapid reduction in the beverage temperature. Such a temperature differential could not be established or maintained if the control bulb were secured to the cold plate or to the refrigerating coil and directly responsive to the temperature thereof, as pointed out heretofore.

It has been pointed out heretofore that the container bottom 27 is relatively thin and flexible so that it may conform to minor irregularities in the surface of the cold plate. In order to further assure a good heat conductor contact between the control bulb 22 and the container bottom, I prefer to crown the control bulb and insulating ring slightly so that the center of the control bulb is several thousandths of an inch higher than the general plane of the cold plate surface.

As shown in Figure 2, the shaft 38 extends from one end of motor 13 and drives a fan 14 secured thereto. The other end of the motor is provided with a reduction gear 39 having a vertical shaft 40 rotating at a speed slower than that of motor 13. Crank 41 is secured to and supported by shaft 40 and is coupled, by means of a connecting link 23, to a crank 42, having a greater throw than crank 41, mounted on the lower end of agitator shaft 15. Crank 41 will, therefore, have an oscillating motion and will oscillate agitator 51 through shaft 15.

The fan 14 draws air into the base of the machine through inlet vent openings 79 and duct or tunnel 81. This air is then forced through condenser 18 and out to the atmosphere through outlet vent openings 80. This current of air serves to cool the condenser and other mechanism in the base generating heat. By flowing air through the condenser in the direction indicated I have eliminated much of the difficulty due to the collection of dirt on the condenser which rapidly accumulates when the conventional direction of air flow opposite to mine is employed. For reasons which I am unable to explain, my refrigerating mechanism will operate for long periods of time without the usual accumulation of dirt in the condenser which obviously impairs the efficiency of the system. It may be that the fan in my mechanism acts as a centrifugal dust separator and that the eddy currents created by the passage of air around the mechanism in the base before reaching the condenser may account, in part, for the new and unexpected results obtained by my arrangement.

The agitator drive shaft is journaled for oscillation in a vertical support or post 52 mounted on the base centrally of trough 44 and between the outer shell 24 and the beverage container 25. The upper end of the drive shaft engages and operates the agitator 51. This arrangement is not a part of my invention as claimed herein.

As shown in Figure 1, my agitator is provided with a horizontal portion 88 parallel to and closely adjacent the bottom of the container. In operation this portion of the agitator will assure adequate agitation of the beverage adjacent the bottom of the container, thus aiding in the maintenance of a substantially uniform temperature throughout the beverage and inhibiting the formation of ice due to freezing of the beverage on the container bottom.

Cold plate 21 is supported on one or more annular rings 60 below which a disk 61 is secured. These rings and the disk may be made of plywood or other suitable material. This arrangement provides a space 62 below the cold plate which may be filled with a suitable insulating material such as "Santocel." This assembly forms a heat insulating bulkhead between the mechanism in the base and the cold plate, thus contributing to the efficient operation of the dispenser. A suitable opening 63 in the disk provides a passageway for the capillary tube 94 and the inlet and outlet tubing for coil 19, all of which connect to their respective associated elements within the base. The bulkhead assembly is supported on base 64 by means of a plurality of posts 65 spaced about the circumference thereof.

In order to remove the beverage container the outer shell 24 is first lifted off the base 10, and the agitator 51 is then lifted off the drive shaft 15 and support post 52 whereupon an automatic switch arrangement, not shown, may operate to disconnect the electrical elements from the power line. The beverage container may then be lifted off the cold plate for emptying or cleaning.

While I have described certain features of my invention more or less specifically, it will be evident to those skilled in the art that various changes and modifications may be resorted to without departing from the spirit or scope of the appended claims.

I claim:

1. In a beverage dispenser, a cold plate having a substantially flat surface, the perimeter of said cold plate being joined to a depressed trough surrounding said cold plate and located in a plane below and parallel to the surface thereof, said cold plate and trough being supported on a base enclosed in a casing said casing extending above the surface of the trough for a distance sufficient to maintain in a centered concentric position an outer shell which rests on the perimeter of said trough, a container having a sidewall with an upper and lower edge and a flat bottom intermediate said edges supporting the container on the cold plate, the portion of said sidewall below the container bottom cooperating with the perimeter of said cold plate to facilitate placement and prevent lateral displacement of the container on the cold plate and prevent the entry of moisture between the cold plate and container bottom, said sidewall portion below the container bottom also cooperating with said trough to further guard against entry of moisture between the cold plate and container bottom.

2. The structure of claim 1 including, in addition a temperature responsive control element located centrally of said cold plate and insulated therefrom, the top surfaces of said cold plate, insulation and control element defining a continuous area slightly raised centrally.

References Cited in the file of this patent

UNITED STATES PATENTS

| Number | Name | Date |
|---|---|---|
| 2,494,719 | Rabjohn | Jan. 17, 1950 |
| 2,502,589 | Rabjohn | Apr. 4, 1950 |
| 2,513,610 | Williams | July 4, 1950 |